United States Patent Office 3,133,066
Patented May 12, 1964

3,133,066
4-AMINO-2-(HALOPHENYLALKYL)-5-METHYLPYRIMIDINES
Elizabeth Jean Hemingway, Ilford, Glyn Evan Lee, Brentwood, Dennis George Orton, Hornchurch, and William Robert Wragg, Woodford Green, England, assignors to May & Baker Limited, Dagenham, Essex, England, a British company
No Drawing. Filed June 4, 1962, Ser. No. 199,669
Claims priority, application Great Britain June 9, 1961
3 Claims. (Cl. 260—256.4)

This invention relates to new pyrimidine derivatives, to processes for their preparation and to pharmaceutical compositions containing them.

According to the present invention, there are provided, as a new class of chemical compounds, the substituted pyrimidines of the general formula:

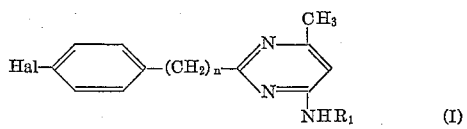

wherein $R_1$ represents a hydrogen atom or an alkyl or acyl group containing not more than four carbon atoms, Hal represents a halogen (preferably chlorine) atom, and $n$ represents 1 or 2, and their acid addition salts.

The aforesaid pyrimidine compounds have been found to possess valuable therapeutic properties being particularly useful as diuretics, and natriuretics and/or saluretics and as useful adjuncts in the treatment of hypertension. Comparative experiments indicate that they are more active and less toxic than the known diuretic agent Chlorazanil (2-amino-4-p-chloroanilino-1,3,5-triazine). The preferred compounds of this invention are 4-amino-2-p-chlorobenzyl-6-methylpyrodimine and its acid addition salts, which have about four times the diuretic activity of chlorazanil and considerably diminished toxicity when tested in mice.

According to a feature of the invention, the substituted pyrimidines of general Formula I are prepared by the reaction of a halogenopyrimidine of the formula:

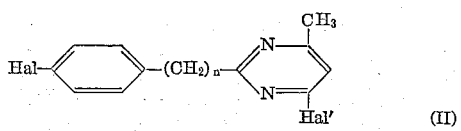

(wherein Hal' represents a halogen atom, such as chlorine or bromine, and Hal and $n$ are as hereinbefore defined) with a compound of the formula:

$$R_1NH_2 \qquad (III)$$

wherein $R_1$ is as hereinbefore defined.

The reaction may be effected by heating the reactants in the presence or absence of a solvent but is preferably effected by heating the halogenopyrimidine with an aqueous solution of the compound of Formula III. The reaction may alternatively be effected by passing ammonia or a gaseous amine of Formula III through a hot solution of the halogenopyrimidine of Formula II in phenol.

According to a further feature of the invention, the compounds of Formula I in which $R_1$ represents a hydrogen atom are prepared by the reaction of an amidine of the formula:

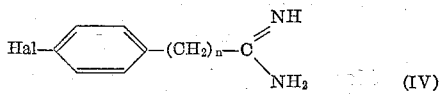

(wherein Hal and $n$ are as hereinbefore defined) with β-iminobutyronitrile.

The intermediates of Formula II may be prepared according to methods known per se. Thus, they may be conveniently obtained from the amidines of Formula IV (or acid addition salts thereof) by reaction with an acetoacetic ester in the presence of a base, such as sodium hydroxide, to produce a 2 - phenylalkyl-4-hydroxy - 6-methylpyrimidine, and treatment of the resultant 4-hydroxy - 6 - methylpyrimidine with a phosphorus oxyhalide, such as phosphorus oxychloride, to replace the hydroxy group by a halogen atom thereby to obtain the desired 2-phenylalkyl - 4 - halogeno - 6 - methylpyrimidine of Formula II. This method of synthesis is depicted in the following reaction scheme:

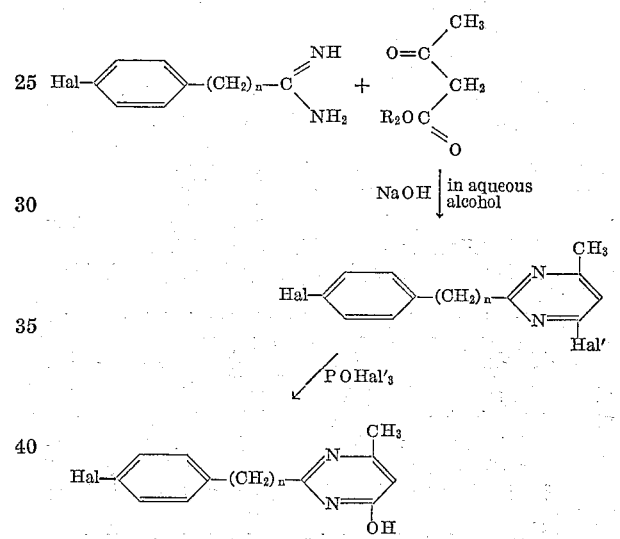

wherein $R_2$ represents an alkyl group containing not more than four carbon atoms, and Hal, Hal' and $n$ are as hereinbefore defined.

It is within the scope of the present invention to prepare a substituted pyrimidine of general Formula I by first preparing another of said compounds which has a substituent in the 4-position of the pyrimidyl ring different from that desired and thereafter converting said substituent to the desired substituent. Thus, compounds of general Formula I, where $R_1$ represents a hydrogen atom, may be converted to compounds of general Formula I in which $R_1$ represents an acyl group by reaction with an acylating agent, for example an acid halide or acid anhydride.

For therapeutic purposes, the substituted pyrimidines of general Formula I may be used as such or in the form of non-toxic acid addition salts, i.e. salts containing anions that are relatively innocuous to the animal organism when used in therapeutic doses so that the beneficial physiological properties inherent in the parent compounds are not vitiated by side-effects ascribable to those anions. Suitable non-toxic acid addition salts include hydrohalides (for example, hydrochlorides), phosphates, nitrates, sulphates, maleates, fumarates, citrates, tartrates, methane sulphonates, ethane disulphonates, and isethionates. These salts may be made from the bases of general Formula I by the methods heretofore used in the art for making acid addition salts. For example, the acid addition salts may be made by mixing the base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention.

*Example I* p-Chlorobenzylcyanide (30.3 g., 0.2 mole) was dissolved in dry ethanol (10.1 g., 0.22 mole) and cooled in ice. Dry hydrogen chloride was passed through until the solution became viscous, and finally crystallised. It was allowed to stand over sulphuric acid for five days and was then triturated with sodium-dried ether. The buff crystalline product was filtered off and dried over silica gel to give ethyl p-chlorophenylacetiminate hydrochloride (40.2 g.).

Dry ethanol (175 cc.) was cooled in ice and gassed with ammonia to give a 9% w./w. increase. A suspension of the above ethyl p-chlorophenylacetiminate hydrochloride (40 g., 0.17 mole) in ethanol (100 cc.) was added and the mixture was stirred overnight. The solution obtained was evaporated to dryness and the cream coloured residue was collected. It was washed with acetone and dried, giving a white solid, M.P. 181–184° C. (28 g.). Crystallisation from isopropanol gave white prisms, M.P. 186–189° C., of p-chlorophenacetamidine hydrochloride.

p-Chlorophenacetamidine hydrochloride (25.6 g., 0.125 mole) and acetoacetic ester (15.8 cc., 16.2 g., 0.125 mole) were stirred with a solution of sodium hydroxide (10 g., 0.25 mole) in water (18 cc.) and ethanol (80 cc.) for 20 hours at room temperature. Water (300 cc.) was added and the mixture was filtered. The filtrate was acidified with hydrochloric acid and the white precipitate was filtered off and dried (27.5 g.). Recrystallisation from ethyl Cellosolve gave white prisms, M.P. 221–229° C., of 2-p-chlorobenzyl-4-hydroxy-6-methylpyrimidine (19 g.).

2-p-chlorobenzyl-4-hydroxy-6-methylpyrimidine (14.1 g., 0.06 mole) and phosphorus oxychloride (50 cc.) were heated under reflux for 3 hours. The orange solution obtained was poured into iced ammonia solution and the precipitate obtained was filtered off, ground with ammonia solution, washed with water and dried. Crystallisation from ethanol gave pale yellow needles, M.P. 69–71° C. of 4-chloro-2-p-chlorobenzyl-6-methylpyrimidine (5.8 g.).

4-chloro-2-p-chlorobenzyl-6-methylpyrimidine (2.7 g., 0.0108 mole) was heated in concentrated ammonia solution (15 cc.) at 140–150° C. for 12 hours. The pale yellow crystalline solid obtained was filtered off, washed with water and dried. Crystallisation from ethanol gave pale yellow prisms, M.P. 189–194° C., of 4-amino-2-p-chlorobenzyl-6-methyl-pyrimidine (1.93 g.).

*Example II*

4-chloro-2-p-chlorobenzyl-6-methylpyrimidine (prepared as described in Example I) (6.3 g.) was heated in a sealed tube with methylamine (3.1 g.) in ethanol (6.2 ml.) for 12 hours at 130–140° C. The solution obtained was diluted with ether and filtered from the precipitated methylamine hydrochloride. It was evaporated to dryness and the pale yellow syrupy residue was triturated with ethereal hydrogen chloride. The yellow solid (4.85 g.) obtained was filtered off and dried at 110° C. Crystallisation from ethanol/ether gave 2-p-chlorobenzyl-6-methyl-4-methylaminopyrimidine hydrochloride (3.25 g.) as yellow prisms, M.P. 229–232° C. Recrystallisation from ethanol raised the melting point to 231–235° C.

The present invention further includes within its scope pharmaceutical compositions which comprise one or more compounds of general Formula I, or non-toxic acid addition salt thereof, in association with a pharmaceutical carrier. In clinical practice the compounds of the present invention will normally be administered orally so that compositions suitable for oral administration are preferred.

Solid compositions for oral administration include compressed tablets, pills, dispersible powders and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions and suspensions containing inert diluents commonly used in the art, such as water and liquid paraffin. Besides inert diluents, such compositions may also comprise adjuvants, such as wetting, and suspending agents, and sweetening and flavouring agents.

The compositions according to the invention for oral administration also include capsules of absorbable material such as gelatin containing one or more of the active substances with or without the addition of diluents or excipients.

The percentage of active ingredient in the compositions of the invention may be varied, it being necessary that it should constitute a proportion such that a suitable dosage shall be obtained. Obviously several unit dosage forms may be administered at about the same time and the optimum dosage will vary from patient to patient. In general, the preparations of the present invention should normally contain at least 0.1% by weight of active substance in the case of oral preparations.

The following example illustrates pharmaceutical compositions according to the invention.

*Example III*

Tablets containing 0.05 g. of active material were prepared according to the following procedure (for 100 tablets).

| Ingredients: | G. |
| --- | --- |
| 4-amino-2-p-chlorobenzyl-6-methylpyrimidine | 7.4 |
| Lactose | 12.4 |
| Polyethylene glycol 6000 | 8.0 |
| Tragacanth | 0.4 |
| Sucrose | 0.3 |
| Talc | 1.0 |
| Magnesium stearate | 0.1 |
| Distilled water and ethanol, q.s. | |

The pyrimidine compound, tragacanth, lactose, sucrose, talc and magnesium stearate were passed through a 20 mesh sieve and mixed together for 20 minutes. The polyethylene glycol was dissolved in a mixture of water (2.0 ml.) and ethanol (2.0 ml.) The mixed powders were wetted with this solution, the moist mass passed through a 10 mesh sieve and then dried at 40° C. with circulating air until the moisture content was about 2 to 3%. The granules were broken on a 16 mesh sieve and compressed into tablets of 0.20 g. weight by using $^{10}\!/_{32}''$ punches and dies.

We claim:

1. A compound of the formula:

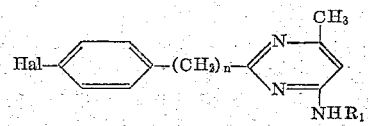

wherein $R_1$ represents a member of the class consisting of a hydrogen atom and alkyl groups containing up to four carbon atoms, Hal represents a halogen atom, and $n$ represents an integer selected from 1 and 2, and non-toxic acid addition salts thereof.

2. 4-amino-2-p-chlorobenzyl-6-methylpyrimidine.

3. 2 - p - chlorobenzyl-6-methyl-4-methylaminopyrimidine.

References Cited in the file of this patent

UNITED STATES PATENTS

| | | |
|---|---|---|
| 2,576,939 | Hitchings et al. | Dec. 4, 1951 |
| 2,670,351 | Jacob | Feb. 23, 1954 |
| 2,928,768 | Freedman et al. | Mar. 15, 1960 |
| 2,967,130 | Sanders et al. | Jan. 3, 1961 |

OTHER REFERENCES

Wagner et al.: Synthetic Organic Chemistry (New York, 1953), page 666.

Elderfield: Heterocyclic Compounds, vol. 6 (New York, 1957), pages 267–271.